United States Patent
Löytty (10) Patent No.: US 12,000,335 B2
(45) Date of Patent: Jun. 4, 2024

(54) METHOD AND APPARATUS FOR IMPROVING ENERGY EFFICIENCY IN EXISTING GAS TURBINE COMBINED CYCLE PLANTS

(71) Applicant: Ari Löytty, Heinola (FI)

(72) Inventor: Ari Löytty, Heinola (FI)

(*) Notice: Subject to any disclaimer, the term of this patent is extended or adjusted under 35 U.S.C. 154(b) by 0 days.

(21) Appl. No.: 17/972,598

(22) Filed: Oct. 25, 2022

(65) Prior Publication Data
US 2023/0145545 A1    May 11, 2023

(30) Foreign Application Priority Data

Nov. 10, 2021   (FI) ........................................ 20210068

(51) Int. Cl.
*F02C 6/00* (2006.01)
*F01K 3/26* (2006.01)
*F02C 3/30* (2006.01)

(52) U.S. Cl.
CPC ................ *F02C 6/00* (2013.01); *F01K 3/265* (2013.01); *F02C 3/305* (2013.01); *F05D 2230/80* (2013.01); *Y02T 50/60* (2013.01)

(58) Field of Classification Search
CPC ........................................................ F02C 6/18
See application file for complete search history.

(56) References Cited

U.S. PATENT DOCUMENTS

| | | | |
|---|---|---|---|
| 3,266,246 A | 8/1966 | Heller et al. | |
| 5,285,627 A * | 2/1994 | Losel | F01K 23/067 60/39.12 |
| 5,839,269 A * | 11/1998 | Frutschi | F01K 23/106 60/39.182 |
| 5,992,138 A * | 11/1999 | Bruckner | F01K 23/106 122/7 B |
| 6,244,035 B1 * | 6/2001 | Krill | F01K 23/10 60/39.182 |
| 6,442,924 B1 * | 9/2002 | Talley | F01K 23/106 60/39.182 |
| 11,300,011 B1 * | 4/2022 | Feher | F01K 13/02 |

(Continued)

FOREIGN PATENT DOCUMENTS

| | | |
|---|---|---|
| EP | 2290201 A2 | 3/2011 |
| EP | 4080019 A1 | 10/2022 |

OTHER PUBLICATIONS

H. Jericha and M. Fesharaki, "Multiple Evaporation Steam Bottoming Cycle," Presented at the International Gas Turbine & Aeroengine Congress & Exhibition Orlando, Florida—Jun. 2-5, 1997, 97-GT-287. (Year: 1997).*

(Continued)

*Primary Examiner* — David P. Olynick
(74) *Attorney, Agent, or Firm* — Laine IP Oy (57) ABSTRACT

A method and apparatus for improving the energy efficiency of an existing gas turbine combined cycle plant, which includes a gas turbine having a compressor that pressurizes combustion air which is combusted with fuel in a combustion chamber to form combustion gases. The compressor is followed by a turbine, a high temperature heat exchanger, a low temperature heat exchanger, and a secondary process steam turbine II. Water from the secondary process steam turbine II is condensed in a following condenser-heat exchanger, pressurized by a following pump, and then is vaporized.

28 Claims, 6 Drawing Sheets

(56) References Cited

U.S. PATENT DOCUMENTS

2010/0058764 A1   3/2010   Conchieri
2010/0077722 A1   4/2010   Sengar et al.
2013/0098313 A1   4/2013   Pang
2014/0250906 A1   9/2014   Löytty
2016/0201521 A1   7/2016   Karthauser
2020/0332681 A1*  10/2020  Uechi ................. F01K 7/32

OTHER PUBLICATIONS

GE Power Systems: Structured Steam Turbines for the Combined-Cycle Market. GER-4201, May 2001, 18 pages.
Gulen: Étude on Gas Turbine Combined Cycle Power Plant—Next 20 Years. Journal of Engineering for Gas Turbines and Power. Sep. 2015, 14 pages.
Kotowicz et al: Maximisation of Combined Cycle Power Plant Efficiency. Acta Energetica, 2015, 4/25, pp. 42-48.
Kwon et al: A study on 65 % potential efficiency of the gas turbine combined cycle. Journal of Mechanical Science and Technology, 2019, vol. 33, pp. 4535-4543.
Mines Paristech: Optimization of a dual pressure combined cycle by the pinch method. 2016, 2 pages.
Srinivas: Thermodynamic modelling and optimization of a dual pressure reheat combined power cycle. Sadhana, Oct. 2010, vol. 35, Part 5, pp. 597-608.
Wikipedia: Heat pump and refrigerationcycle. Retrieved Oct. 19, 2022. https://en.wikipedia.org/wiki/Heat_pump_and_refrigeration_cycle.

* cited by examiner

METHOD AND APPARATUS FOR IMPROVING ENERGY EFFICIENCY IN EXISTING GAS TURBINE COMBINED CYCLE PLANTS

FIELD

The present invention relates to a method and apparatus for improving energy efficiency in existing gas turbine combined cycle plants.

BACKGROUND

In current gas turbine combined cycle processes, a compressor pressurizes the air that is burned with fuel in the combustion chamber, followed by the turbine and the waste heat boiler, wherein the water from the secondary process cycle is vaporised. The secondary process circulation comprises a normal steam process, in which newest large plants use intermediate superheating of steam. This is due to the fact that the maximum temperature of the gas turbine and consequently the temperature of the combustion gases have become so high that they allow the use of a higher maximum pressure in the gas turbine process and in the Rankine steam process, which without intermediate superheating would cause the water content of the steam to become too high. In the secondary process, after the low-pressure turbine, steam is condensed into water in the condenser, the water then being pressurised by the pump to the maximum pressure and preheated and vaporised in a waste heat boiler. Subsequent to the waste heat boiler, the steam enters the steam turbines of the process circulation. Large plants utilize a so-called dual-pressure level process. This is due to the excess heat in the low-temperature area. In a plant according to the invention this "issue" is solved in a different way. There is also another problem in existing combined-cycle power plants, and this patent application consists of a simultaneous solution to both of these problems. Another, as large—and even greater—problem is the utilisation of condensation heat from steam generated by combustion and, in the case of existing plants, its non-utilisation.

At present, with natural gas being used as fuel, electricity is usually generated in a combined gas turbine—steam power plant process. In the future, in the so-called precombustion process, fuel, such as coal, will be gasified and converted into hydrogen and carbon dioxide, of which hydrogen will be combusted in the gas turbine. The problem is the high exit temperature of the combustion gases in the so-called basic process, because the so-called pinch point of steam limits the heat transfer of the waste heat boiler (pinch point being the point at which the vaporisation of water begins). This has been partly solved by using the dual-pressure level process, but in the process the partial efficiency of the lower pressure level is relatively poor. Currently, the highest efficiency of a combined heat and power plant in the world is probably slightly over 64%.

SUMMARY OF INVENTION

Figure 1:
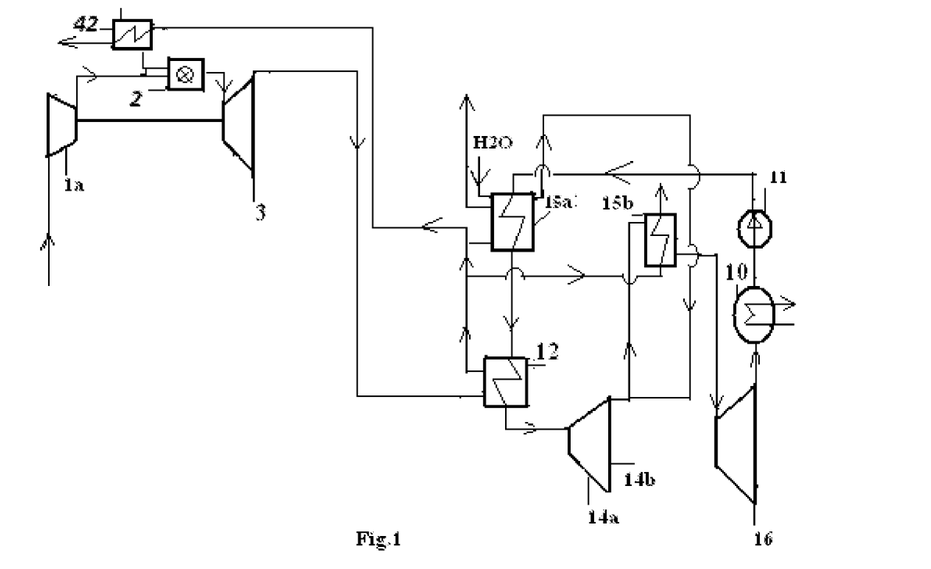
FIG. 1 illustrates a basic process of the invention. The gas turbine process will in the following be referred to as the primary process and the steam turbine process referred to also as the secondary process.

Combined plants with the highest operation efficiency are dual-pressure level processes because they don't utilise an invention that is only disclosed in this patent application. The benefit of additional combustion in the residual oxygen present in gas turbine combustion gases (the combustion gases still contain have roughly half of the oxygen) at the beginning of the waste heat boiler is limited, because after the temperature of the combustion gases has increased approximately 150 degrees, the hT lines of the hT drawing for combustion gases and water preheating are similar, i.e. they have approximately the same slope. Currently the intermediate superheating is often in the flow direction between the superheater and the vaporiser, which lowers the temperature of the combustion gases and leads to an even higher exit temperature of the combustion gases due to the pinch point, which is eliminated in existing plants by using a dual-pressure level process. The advantage of this invention is based on the fact that it utilizes the excess energy remaining after the "pinch point" in the intermediate superheating of steam and, at the same time, utilizes the condensation heat of the steam generated by the combustion to vaporise the moist steam to a saturated point prior to the intermediate superheating. In FIG. 1, saturated point is reached only in the heat exchanger 15$b$, since a part of the exhaust gases passes into a heat exchanger 15$b$ parallel to the heat exchanger 15$a$. Approximately ⅔ of the mass flow is sufficient for preheating water, and approximately ⅓ of the mass flow is then left for intermediate superheating. This is almost exactly the optimal amount needed for intermediate superheating.

Thus, in the inventive entirety, the novelty is also the increase of enthalpy of steam before the intermediate superheating with the condensation heat of the steam contained in the combustion gases—after all, when the fuel burns, steam is naturally formed. Since the combustion gases are removed from the process at a pressure of 1 atm, the pressure of the steam to be heated with the combustion gases must naturally be lower than this.

In practice, in a commercial version 0.7 bar could be quite close. In several constructions, the energy released by the condensation heat of the steam contained by combustion gases is higher than that absorbed by the steam in the process circulation, so it is useful to feed additional water into the steam in the process circulation at the intermediate superheating pressure. The invention differs from the current dual-level (pressure) gas turbine combined cycle plants in that in existing plants excess low temperature combustion gases are used to vaporise water, while in the invention excess low temperature combustion gases are used to increase the steam concentration and for intermediate superheating the steam. In this patent application it is disclosed that it is much more advantageous to apply intermediate superheating to v at a pressure of less than 1 atm than at the intermediate superheating pressure used in existing combined plants.

This pressure level in the existing plants is due to the fact that the in the steam process, the aim is to apply intermediate superheating at a relatively high temperature, which results in a high average temperature of introduced heat, resulting in a high efficiency according to the theoretical Carnot equation, i.e. the higher the intermediate superheating pressure, the higher the Carnot efficiency. And the lower the intermediate superheating pressure, the lower the Carnot efficiency. It is therefore contrary to theory and reason to apply intermediate superheating to steam at a pressure of less than 1 bar, i.e. it is not an obvious solution for one skilled in the art. However, this ultimately leads to a higher efficiency because the condensation heat of the steam formed in combustion can be utilised.

There are also many other aspects that support the fact that the invention is not obvious to one skilled in the art. Thus, the condensation heat of the steam formed in combustion has not previously been used in intermediate superheating pressure to increase the enthalpy/steam content of process steam, which significantly improves the efficiency, as there is virtually no energy loss in the condensation of steam. Moreover, the method has not been disclosed in literature/research, the method achieving by far the highest thermal efficiency in the world and, of course, these plants do not yet exist, as the inventive idea has only been disclosed in this patent application. If the situation were contrary, competition and buyer pressure would very likely lead to the invention being put into practice in working plants. In literature, it has been considered impossible to achieve a thermal efficiency of 70% with gas turbine combined cycle without combining a fuel cell with it, but the most advanced version of the invention provided with 3D vanes may achieve 70% efficiency without a fuel cell as well (of course, a fuel cell can also be combined with the invention). In patent laws, "obvious" means e.g. replacing natural gas with gasified coal or the like, but not considerable novel, undisclosed inventive features by means of which a considerable additional advantage is achieved.

A less common gas turbine process is the so-called STIG (Steam Injected Gas turbine) process, in which steam is supplied to the gas turbine. It is also suitable for use in a plant according to the invention, and the basic process or the STIG design allow achieving an electricity production efficiency of about 67 to 68.5%. It should be noted that in all existing gas turbines with cooling of the first vanes about 10% of the post-charge air mass flow will be extracted for cooling the combustion chamber duct and turbine vanes. Naturally, steam or an air/steam mixture can be used instead of air. If the plant is a so-called CHP (Combined Heat and Power) plant, excess low-temperature heat can be utilised, for example, so that there is an additional combustion in the waste heat boiler or, alternatively, a temperature difference about 150 degrees Celsius higher when the combustion gases enter the waste heat boiler. The electricity production efficiency of the above additional combustion is about 57-58% in a CCGT-CHP plant! For example, in wood combustion a very high (additional) efficiency can be achieved compared to that of about 35% in current Rankine CHP plants. Yet the invention is particularly useful in combined cycle processes with low condenser pressure. This, in turn, requires cold cooling water. It is available in tropical areas as well, as at a depth of about 40 m the water is very cold there as well. It should also be mentioned that, if necessary, additional air can be supplied to the waste heat boiler. The obvious solution for one skilled in the art is to preheat the additional air. The invention is also more competitive in relative terms if it is fuelled by pure hydrogen or a mixture of hydrogen and natural gas. This is due to the utilisation of the condensation heat of steam formed in the combustion.

US Patent application US2014/0250906 A1 discloses a gas turbine combined cycle process. However, it differs from the present invention in essential respects. The inventive idea of the said US patent application is to combine two combustion chambers and a vacuum expansion of the combustion gases. The intermediate superheating of the Rankine steam process combined therewith is effected by means of the waste heat of the compresssor, more precisely with the compressor pressurizing the combustion gases to atmospheric pressure. The said invention does not have a vacuum expansion in the gas turbine, and by making the said US patent application consistent with this also removes the inventive feature, i.e. the US invention does not exist without vacuum expansion and the expansion to a vacuum of at least 0.5 bar is in the patent claims precisely for this reason. Without vacuum expansion the said US patent application corresponds to the Alstom gas turbine combined cycle plant having two combustion chambers. In the US2014/0250906 A1 invention, the intermediate superheating to the final maximum temperature is effected such that the entire mass flow of steam enters the low-pressure steam turbine from heat exchanger utilizing the waste heat from the vacuum compressor. The main solution of the US patent application is a dual-pressure level process, which is currently the most common solution for utilising excess heat in the low-temperature area. However, the most significant inventive feature relates to the utilisation of condensation heat of steam formed in combustion. Above, intermediate superheating has been described as irrational. This is partly because in a "single" Rankine process the aim is to select the intermediate superheating pressure so that the average temperature of introduced heat is as high as possible and the final temperature of the intermediate superheating is the same as the maximum temperature of the Rankine process. This means the intermediate superheating pressure must be relatively high. The intermediate superheating pressures (tables) of 2.4 bar and 4.42 bar have been chosen in the US patent application, the latter providing a higher efficiency. This is due to the same reason, i.e. that the theoretical Carnot efficiency of the process is then higher. Lowering the intermediate superheating pressure from 2.4 bar to 1 bar reduces the efficiency even more than the Carnot efficiency, because exergy losses increase in the range of humid steam (except in the present novel invention). For this reason, the publication "Structured Steam Turbines for the Combined-Cycle Market" by General Electric, a major manufacturer, discussing the optimal intermediate superheating pressure in gas turbine combined cycle in Rankine process under "IP Admission and Reheat Pressure", indicates an optimal intermediate superheating pressure of 23 bar, 25.2 bar or a pressure in this range. Thus, an intermediate superheating pressure of less than 1 atm is not an obvious choice for one skilled in the art. However, if the intermediate superheating pressure is decreased to less than 1 bar, the end result will be the present invention that solves the energy and exergy loss problems of the current combined cycle plants with one solution. In addition, it has been documented that the company authoring the article has been informed about the US2014/0250906 A1 patent application in 2015.

In other words, in the said US patent application, the condensation heat of steam formed in the combustion cannot be utilized. It states (paragraph 19) that "in existing plants, steam is condensed in atmospheric pressure and in vacuum in said US patent, resulting in reduced energy loss". This is thus linked to a lower condensing temperature. As can be seen from the figure in the US patent application, steam formed in the combustion cannot be utilised in the heat exchanger (15), because there is no steam in combustion gases at that point. In the present invention, the condensation heat of the steam formed in combustion can be utilized in the intermediate superheating pressure (vacuum) and/or in the vaporisation of additional water. This significantly improves the efficiency and thus the increase of efficiency cannot be considered obvious as the use of the method has not previously been used or disclosed in literature/Wikipedia. The best known of the inventions related to pressure is probably the pressure cooker used for cooking. It only changes the pressure level, but in the present invention also the energy associated with the phase formation is utilized. Its utilization is maximised because additional water in liquid form is brought to the vacuum, the water being vaporised by the condensation heat of steam formed in combustion. Thus the mass flow of the low-pressure steam turbine increases. In the US2014/0250906 A1 patent application, the vaporisation of additional water (all water not entering the high pressure steam turbine) is not effected by means of the condensation heat of steam from the combustion gases, because subsequent to the low temperature heat exchanger (waste heat boiler) its pressure is reduced by a valve before the heat exchanger (15) and the low pressure turbine. Thus, the waste heat boiler (12a) does not have enough energy/heat for intermediate superheating, which is partly the background of this invention and necessary therein. Thus ⅔ is sufficient for vaporization and ⅓ for intermediate superheating. In literature, there are some publications from a few years ago: "Optimization of dual pressure combined cycle by the pinch method" from 2016 selects 10 bar as the maximum pressure of the additional water cycle. FIG. 3 of "Thermodynamic modelling and optimization of a dual pressure reheat combined power cycle" (Seema S. Bilur, etc.) shows that the condensation heat of steam formed in combustion is not utilised in the intermediate superheating process and not in the dual-pressure process (vaporisation at approximately 170 C). The intermediate superheating pressure of a bit over 20 bar in the previously mentioned publication by one of the leading manufacturers, GE, means an intermediate superheating at a temperature of approximately 600 K 873 K (average temperature of 736.5 K), which gives a Carnot efficiency of the intermediate superheating efficiency of 59.3% at a minimum temperature of 300 K (condenser), which is lower than the total efficiency. However, the total efficiency increases in relation to combined cycle process without intermediate firing. This is due to a simultaneous increase in the vaporisation temperature. There is not even a brief mention in any of the publications of the possibility of a higher efficiency of this patent application, and 70% electricity efficiency, considered to be impossible, will soon be possible. James Watt also utilized the pressure change and improved Thomas Newcomen's steam engine with vacuum expansion in his patented invention. Because the said US patent application and the invention are made by the same person, if the invention were obvious to one skilled in the art, the inventor would naturally have presented the invention already in the US2014/0250906 A1 application and not only now as the result of years of innovating.

US2016/0201521 A1 patent application also presents a recirculation process. Paragraph 7 states that the invention relates to heat pumps and that it generates 3 to 5 times the thermal energy, i.e. it represents a completely different technique and is therefore not a relevant technique. In short, the US patent application produces high temperature thermal energy by means of electricity using a heat pump and the inventive idea of the present invention is to use the condensation heat of steam formed in the combustion in the intermediate superheating and vaporisation of additional water, and to use the excess heat of the low temperature range in the intermediate superheating. The US patent application does not solve these problems because it is not a gas turbine combined cycle but a heat pump and thus does not have intermediate superheating. It is mainly a heat pump for recovering geothermal heat, the primary recirculation medium of which is gaseous carbon dioxide, as indicated in the title of the invention.

The maximum Rankine process values of the Irsching gas turbine combined cycle, completed in the previous decade, is 170 bar/600° C. and thus the process values shown in Table 1 correspond well with reality. The normal good expansion of a steam turbine, corresponding to an isentropic efficiency of about 92%, results in an enthalpy of 2438 kJ/kg in Table 1 at 0.71 bar. This corresponds to a steam concentration of about 90-91% that is used in existing condensing turbines. No steam concentration is available from computer programs and the vapour concentration is derived from the hs plot of steam. Because of this, and also because efficiency calculation is based on enthalpy, the claim mentions enthalpy values. On www.steamtables.com you can find an enthalpy of 2660 kJ/kg for saturated steam at a pressure of 0.71 bar, i.e. in the example case enthalpy increases 222 kJ/kg at a constant temperature. Since in the example case here the steam is expanded to below the concentration of saturated steam, the minimum enthalpy increase at constant temperature with the condensation heat of the steam of combustion gases as disclosed in the claim has become a justified and physical fact, since the vaporisation takes place at constant temperature. Claim 1 thus discloses the necessary measures for reducing energy losses, i.e. increasing the enthalpy of the circulation medium (water) (utilization of the condensation heat of steam formed in the combustion) and intermediate superheating in a low temperature heat exchanger. In the publication "Maximisation of combined cycle power plant efficiency" (Janusz Kotowicz, Mateusz Brzeczek et al.), a temperature difference of 5 C has been chosen for the so-called "pinch point" and thus the maximum value of the vacuum level of the main claim is justified. The publication discloses two intermediate superheatings, the pressures of which are 40 bar and 3 bar, which means that as far as maximisation of efficiency is concerned, the authors have not ended up with a solution according to the invention, even though a pressure of 3 bar is on the same level as that in the US publication. A gas turbine combined cycle plant with two intermediate superheatings has been granted, among others a US patent, i.e. even though just Rankine plant alone also has two intermediate superheatings, so their use in the gas turbine combined cycle plant is not obvious.

The "Reversed Carnot cycle" section of the Wikipedia article "Heat pump and refrigeration cycle" describes a heat pump with expansion in the turbine. However, it is not a gas turbine process, even if the sub-component is a turbine. The above-mentioned Karthauser US2016/0201521 A1 heat pump patent belongs to this field of technology. In a Rankine process heat is introduced into the circulation process at maximum temperature (before turbine) while in a "Reversed Carnot" process heat is removed from the circulation process before the turbine. The underlying reason is that electricity is used to produce high temperature heat and the Rankine process is used to produce heat by means of electricity. The study "A study on 65% potential efficiency of the gas turbine combined cycle" (2019 H. M. Kwon et al.) aims to increase the efficiency of a gas turbine combined cycle plant. There is no mention of utilising the condensation heat of steam according to the present invention. FIG. 4 of "Etude on gas turbine combined cycle power plant next 20 years (Gulen)" shows the development of process exergy efficiency in relation to the theoretical maximum. The heat transfer of a waste heat boiler describes precisely this quantity. FIG. 7 shows the effect of different methods on efficiencies. It does not utilize steam formed in combustion (vacuum intermittent superheating), although a more complex combined cycle with two intermittent superheatings is shown in the figure. The study also makes reference to more futuristic technologies, but there is still no mention of easily implemented vacuum intermediate superheating. It should also be noted that the temperature increase of 0 to 400 K described in the additional claims applies only to the current situation and to cases without additional combustion, as mentioned in the claim. Naturally, all other cases in which the excess heat in a waste heat boiler is equivalent to extra combustion are considered additional combustion. This is the case, for example, where the temperature difference in a waste heat boiler is greater than necessary. The mentioned combined cycle with two intermediate superheatings is also suitable for the application of the inventive method by introducing additional water under vacuum to the low-pressure turbine as an intermediate supply. In a STIG process the same gas turbine pressure ratio can be used as in a process without STIG, if additional combustion is provided in the waste heat boiler. This way a high partial efficiency can be arranged for solid fuel. Without STIG, additional combustion is also required (with the same gas turbine pressure ratio), if the maximum temperature of the Rankine process is increased to 700 C and this additional invention can also be used in existing plants. If the amount of gas to be introduced into the gas turbine process in a STIG application is about half of the mass flow of steam, it is useful to use two-stage heat transfer in a district heating application. Thereby the steam from the Rankine circulation can expand to a lower pressure (approx. 0.5 to 0.7 bar). The ammonia-water mixture, which is considered promising, is also suitable as a circulation medium and exhaust gases can be recirculated. Similarly, natural gas can also be preheated by using combustion gases from a heat exchanger (15$b$) instead of that shown in the figures, or by mixing part of the combustion gases from that heat exchanger (15$b$) with a stream of combustion gas separated from the waste heat boiler for preheating the natural gas. It is also possible to update an old facility by various means.

BRIEF DESCRIPTION OF DRAWINGS

FIG. 3 illustrates the district heating version of the process according to FIG. 2. In addition, it has an additional combustion in the waste heat boiler and the heat exchangers 15$a$ and 15$b$ form a single integrated heat exchanger.

EMBODIMENTS

In the tables 1 and 2, the status points are shown with number plus the letter c (e.g. 1c) and the components without the letter c.

TABLE 1

|     | p(bar) | T(K)  | h(N2) kJ/kg | h)O2) kJ/kg | h(CO2) kJ/kg | h(H2O) kJ/kg |
|-----|--------|-------|-------------|-------------|--------------|--------------|
| 1c  | 1.0    | 288.0 | 15.4        | 13.5        |              |              |
| 2c  | 29.0   | 792.5 | 554.8       | 509.8       |              |              |
| 3c  | 28.4   | 1767  | 1732.2      | 1598.4      | 1779.1       | 5935         |
| 4c  | 1.04   | 917.5 | 696.8       | 643         | 679          | 3804         |
| 5c  | 6      | 1649  |             |             | 1623.3       | 5615         |
| 7c  | 173.5  | 626   |             |             |              |              |
| 8c  | 0.7    |       |             |             |              | 1700         |
| 11c | 177.0  | 313   |             |             |              | 130          |
| 13c | 170.0  | 873   |             |             |              | 3560         |
| 14c | 0.036  |       |             |             |              | 2609         |
| 15c | 0.035  | 300   |             |             |              | 111          |
| 17c | 1.0    | 330   | 59.1        | 52.1        | 48.2         | 238          |
| 20c | 0.71   |       |             |             |              | 2438         |
| 26c | 1.02   | 671   | 420.5       | 383.7       | 391.9        | 3279         |
| 30c | 1.02   |       |             |             |              |              |
| 31c | 1.0    | 330   |             |             |              |              |
| 34c | 0.71   |       |             |             |              |              |

TABLE 2

|     | p(bar) | T(K)  | h(N2) kJ/kg | h)O2) kJ/kg | h(CO2) kJ/kg | h(H2O) kJ/kg |
|-----|--------|-------|-------------|-------------|--------------|--------------|
| 1c  | 1.0    | 288.0 | 15.4        | 13.5        |              |              |
| 2c  | 24.0   | 751.8 | 509.4       | 467.1       |              |              |
| 3c  | 23.52  | 1767  | 1732.2      | 1598.4      | 1779.1       | 5935         |
| 4c  | 1.04   | 979.1 | 768.1       | 709.6       | 754.1        | 3943         |
| 7c  | 173.5  | 626   |             |             |              | 1700         |
| 8c  | 0.7    |       |             |             |              | 3170         |
| 11c | 177.0  |       |             |             |              | 130          |
| 13c | 170.0  | 873   |             |             |              | 3560         |
| 14c | 170.0  |       |             |             |              | 2609         |
| 15c | 0.035  | 300   |             |             |              | 111          |
| 17c | 1.0    | 330   | 59.1        | 52.1        | 48.2         | 238          |
| 20c | 0.71   |       |             |             |              | 2438         |
| 21c | 1.02   |       |             |             |              |              |
| 26c | 1.02   | 671   | 420.5       | 383.7       | 391.9        | 3279         |
| 27c | 24.0   |       |             |             |              |              |
| 29c | 1.02   |       |             |             |              |              |
| 30c | 1.02   |       |             |             |              |              |
| 31c | 1.0    | 330   |             |             |              |              |
| 32c | 24.5   |       |             |             |              | 3026         |
| 33c | 24.0   | 873   |             |             |              | 3686         |
| 34c | 0.71   |       |             |             |              |              |

FIG. 1 illustrates a gas turbine (combined cycle) process in which a compressor 1$a$,$b$ pressurises the air which is burned with fuel (e.g. natural gas) in a combustion chamber 2 followed by a turbine 3 and a high temperature heat exchanger 12. It is advantageous to preheat natural gas prior to combustion. For example, it is advantageous to do this by separating a part of the combustion gases subsequent to the high temperature heat exchanger 12 (alternatively the combustion gases exiting the heat exchanger 15$b$ are suitable for this either alone or mixed with the above). Thus these combustion gases heat the natural gas in the heat exchanger 42. The rest of the combustion gas mass flow goes to the low-temperature heat exchangers 15$a$, 15$b$. In practice, these could often be an integrated heat exchanger as in FIG. 7, but here they are presented as separate units to clarify the inventive idea. In the secondary process, the pump 11 pressurises the water to the maximum pressure and the water is preheated in a low-temperature heat exchanger 15a by means of combustion gases. The feed water is then vaporized and superheated in a high temperature heat exchanger 12 and subsequently expanded in a steam turbine 14a,b to below atmospheric pressure (such as 0.7 bar). The vapour concentration of steam is then finally increased to 100% (X=1.0) by means of the condensation heat of steam produced by combustion, at the latest at the low temperature heat exchanger 15b. Since excess energy is can be recovered from steam generated in combustion, additional water is mixed with the steam from the steam turbine 14a,b. This is the preheated in the low-temperature heat exchanger 15a and partly vaporised partly with the condensation heat of steam formed by combustion. It should be noted that, of course, in all figures in which additional water is introduced into the process, water must be removed if it is necessary to maintain a constant amount of water in the process circulation. In practice, this could be done, for example, by having a two-part pump 11 and by removing excess water between them. The rest of the Rankine cycle steam is thus vaporised in the low temperature heat exchanger 15b and also the intermediate superheating of saturated steam is effected there by means of the heat of the combustion gases. Subsequent to this, steam is then expanded in the steam turbine II 16 and condensed into liquid in the condensing heat exchanger 10.

In FIG. 1, a higher gas turbine pressure ratio can be used, as a lower exit temperature is sufficient. This means a lower exergy loss in the waste heat boiler and a higher single efficiency of the gas turbine process.

Figure 2:
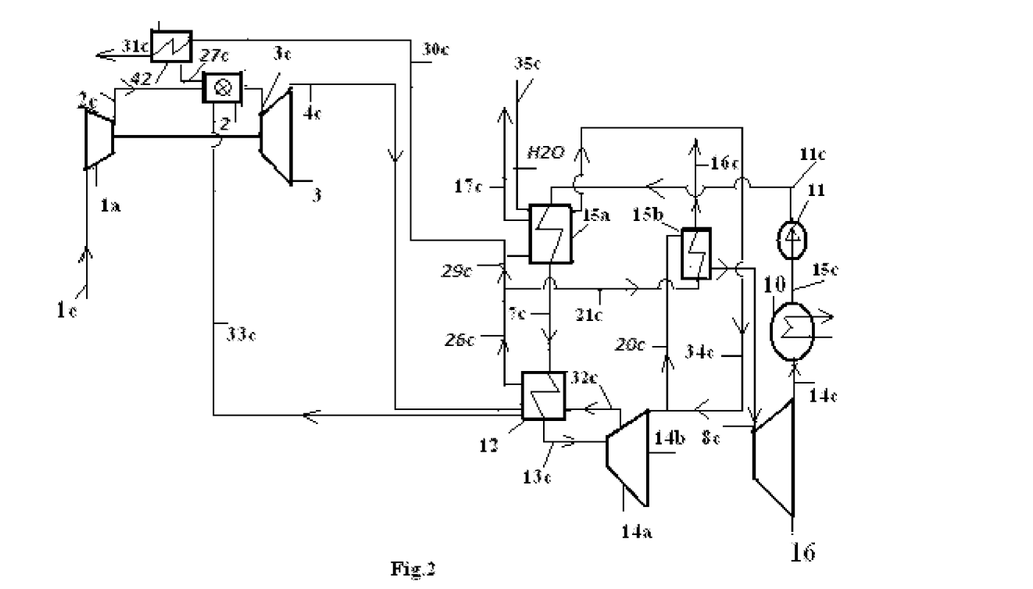
FIG. 2 illustrates the process according to FIG. 1, wherein a part of the steam turbine mass flow is introduced into the combustion chamber. Table 2 illustrates the values of the status points of FIG. 2.

FIG. 2 illustrates the process according to FIG. 1, wherein a part of the steam turbine mass flow is introduced into the combustion chamber 2. Naturally, part of the mass flow of steam can be introduced to the beginning of the turbine 3 vanes to cool the first vanes of the turbine 3. Since the water introduced into the combustion chamber is removed from the process circulation, it must be replaced by additional water. The intermediate outlet from the steam turbine 14a,b is heated to 600° C. in the first part of the high temperature heat exchanger 12, so the temperature of the combustion gases after the turbine 3 can be slightly higher than in the case of FIG. 1. The additional water is vaporised by means of condensation heat of steam of the combustion gases of the heat exchanger 15a and mixed with the mass flow after the steam turbine 14a,b and vaporised/superheated in the heat exchanger 15b.

It should be noted that in FIG. 2 (likewise FIG. 6) the status point 3c corresponds to the turbine mixing temperature and the post-combustion chamber temperature is typically about 100° C. higher due to the cooling of the vanes.

Figure 3:
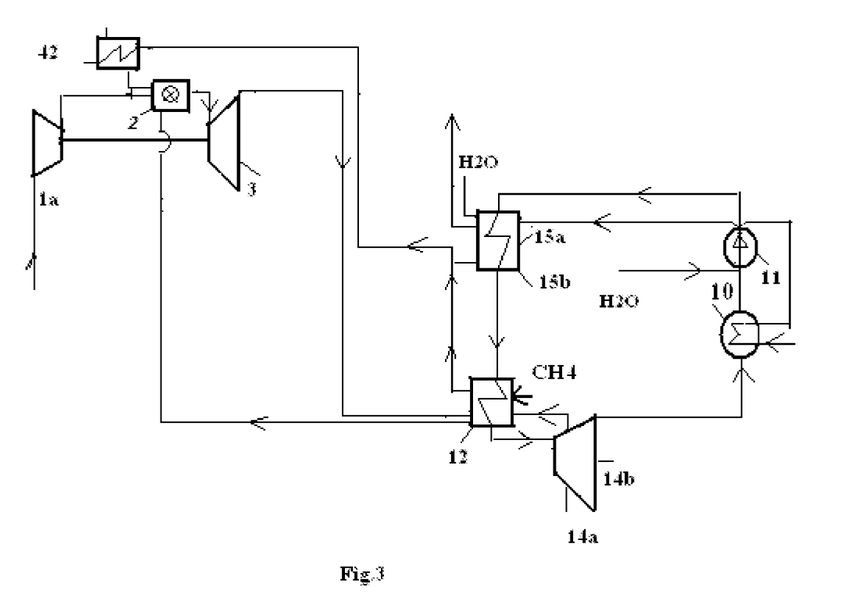

FIG. 3 illustrates the district heating version of the process according to FIG. 2. It also has additional combustion in the high temperature heat exchanger 12 (waste heat boiler) and the low temperature heat exchangers 15a and 15b form a single integrated heat exchanger. Also the high temperature heat exchanger 12 and the low temperature heat exchanger 15a,b could be integrated to form a waste heat boiler, but for easier understanding of the invention they are presented separately. Additional combustion takes place in the process shown in the figure by means of natural gas, but in practice wood, for example, can be used as well. Similarly, additional combustion could equally take place in the low temperature heat exchanger 15a,b. It is advantageous to heat the water for district heating network in two stages, because about half of the mass flow of the steam turbine is directed into the combustion chamber. Thereby the first stage of preheating can be done with steam at about 0.5 bar, whereby more work can be recovered from the steam turbine than in the case of single-phase heating. If there is no intermediate supply from the steam turbine 14a,b to the combustion chamber, preheating of the district heating water can be carried out in two stages using so-called tap preheating. Naturally, the mass flow of the steam circulation must be kept constant by feeding additional water thereto. It should be emphasised that in practice, a CHP construction would normally be in accordance with FIG. 6, so that during summer, with low demand for district heat, the plant would be a normal CC plant, i.e. it would also have a steam turbine II 16 and the flows would be controlled by valves according to the current situation. FIG. 3 is included mainly to simplify the matter.

Figure 4:
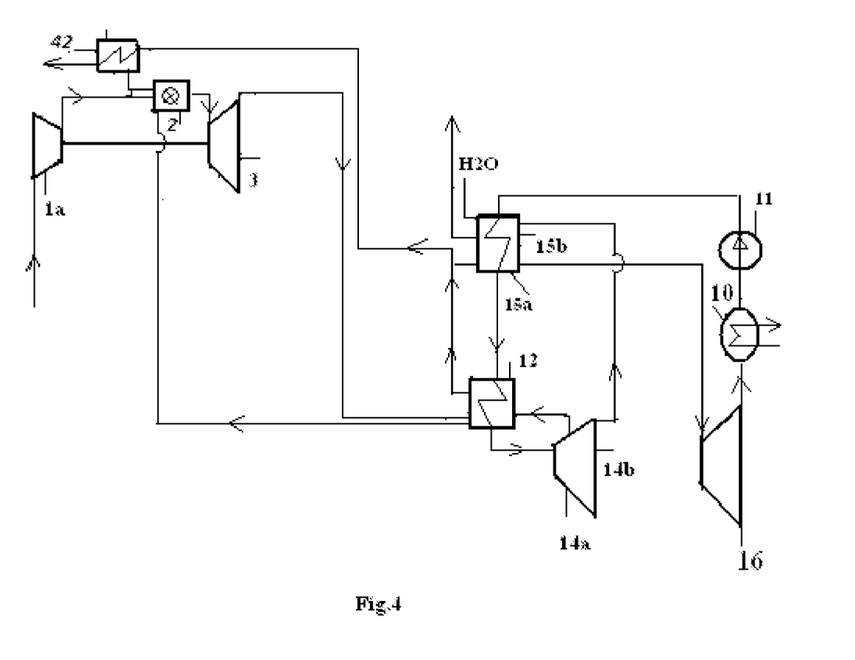
FIG. 4 illustrates a version of FIG. 2, wherein the heat exchangers 15$a$ and 15$b$ form a single integrated heat exchanger assembly.

FIG. 4 illustrates a version of FIG. 2, wherein the heat exchangers 15a and 15b form a single integrated heat exchanger assembly. The additional water is vaporised with the condensation heat of steam of the combustion gases of the heat exchanger 15a, b and superheated with the excess heat of the heat exchanger 15a,b at a pressure of, for example, about 0.7 bar. After this the steam is expanded in steam turbine II 16. This solution is simpler and the arrangement of mass flow is clearer than in the case of FIG. 2.

Figure 5:
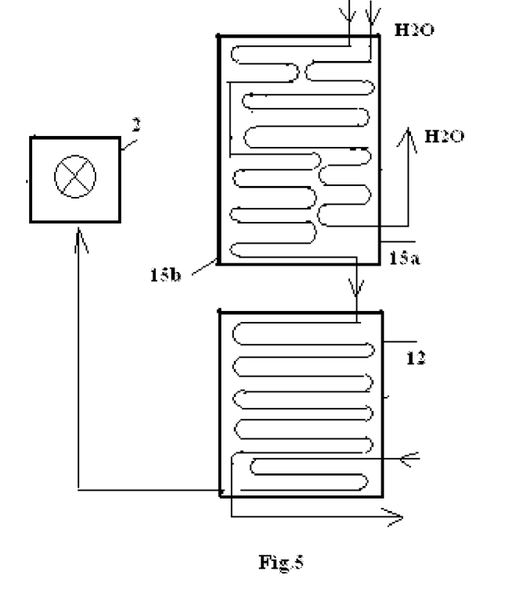
FIG. 5 is a design figure of a waste heat boiler according to FIG. 3.

FIG. 5 shows a structural diagram of steam circulation of a waste heat boiler (heat exchangers 12 and 15a, b of FIG. 3. Naturally, that is just one possible structural solution among many different options. The steam entering the combustion chamber 2 is first preheated at the combustion gas inlet of the heat exchanger 12. At the end of the heat exchanger 15a,b, in the direction of flow of the combustion gases, additional water is vaporised and in the other part of the heat exchanger, feed water is preheated and intermediate superheating of steam is carried out in parallel.

Figure 6:
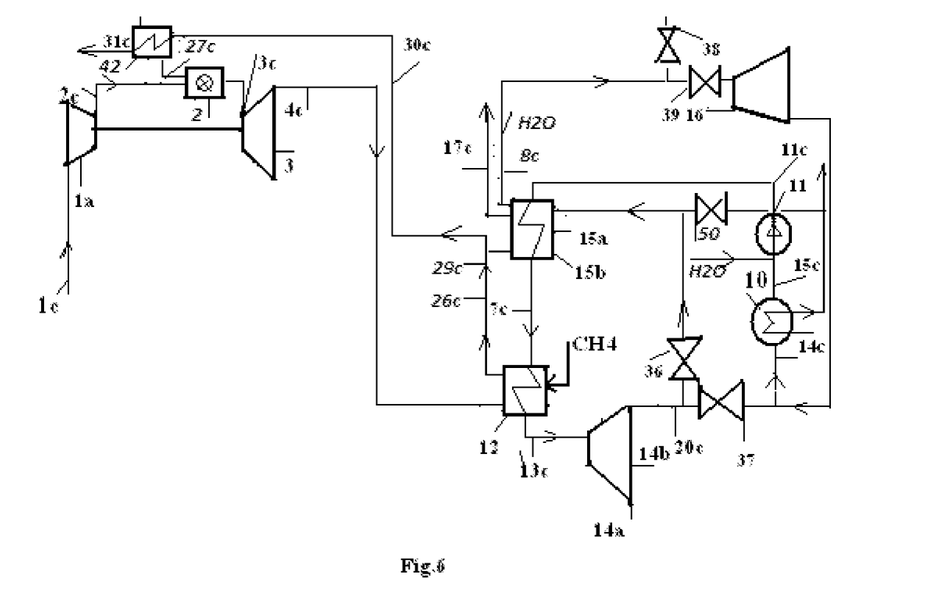
FIG. 6 illustrates a practical version of the process of FIG. 3, i.e. it also includes steam turbine II 16 for electricity production in summer. Table 1 shows the values of the status points of FIG. 6.

FIG. 6 therefore shows a practical CHP version of FIG. 3. The adjustment can be done, for example, by means of sliding pressure and additional combustion. In the figure, additional combustion is effected with natural gas in the high temperature heat exchanger 12, but it can also occur in the heat exchanger 15a,b. Additional combustion can also be effected, for example, with coal or wood, whereby a very high partial efficiency of additional combustion in district heating use is achieved. The valves 36, 37, 38, 39, 50, etc. in the pattern control the flows when the district heat is on/off. The valves are not optimally positioned and skilled in the art will find a better practical solution without any particular inventiveness. In the calculations related to the figure, waste heat boiler additional combustion is not in use, i.e. its mass flow rate is zero.

Figure 7:
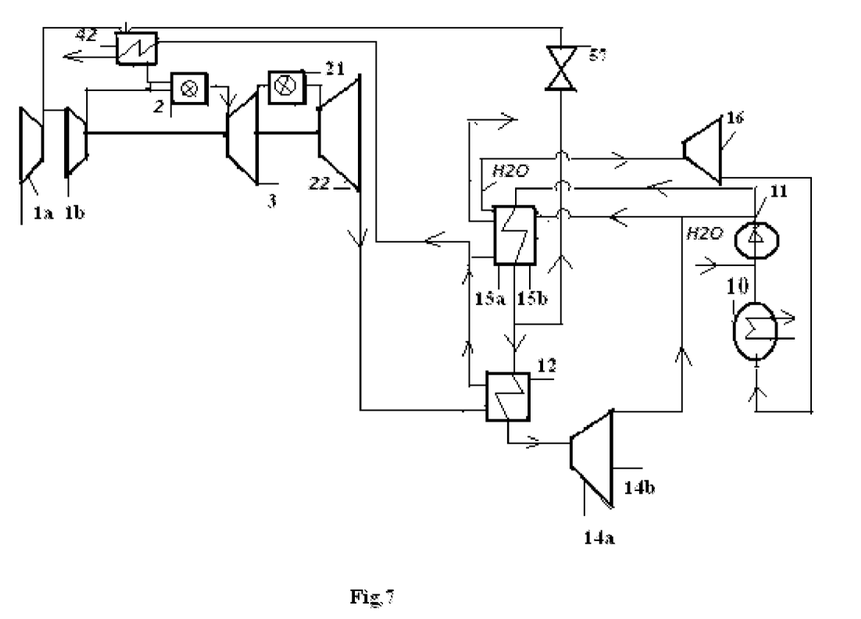
FIG. 7 illustrates a process with the same maximum gas turbine pressure level as in aviation
and additionally intercooling of the compressor with preheated (and partially vaporised) water. The process also comprises two combustion chambers and two turbines in the gas turbine process.

FIG. 7 illustrates a process using maximum pressure level of gas turbines used in aviation (approx. 50 to 60 bar) plus intercooling of the compressor with preheated (and partially vaporised) water. The process also comprises two combustion chambers and two turbines in the gas turbine process. The compressor 1a pressurizes the air to, for example, a pressure of 20 to 30. The partially vaporised branch of the secondary process feed water is then connected to the air mass flow and the compressor 1b pressurises the air to the maximum pressure. In the process this is followed by combustion in the combustion chamber 2 and expansion in the turbine 3. After that there is a second combustion chamber 21. Gas turbines with two combustion chambers are commercially available, the first one was manufactured by Alstom in the 1990s. However, many manufacturers have not manufactured gas turbines with two combustion chambers. This may be due to the fact that cooling of the vanes of the second turbine may be challenging in existing gas turbines, because the temperature of the combustion gases, used to cool the vanes of the second turbine, is much higher than that of single combustion chamber design for cooling the turbine with compressed air. However, in this design, the pressure ratio of the first turbine is much higher than that in the above-mentioned Gas turbine by Alstom, and thus the temperature of the combustion gases after the first turbine is much lower. In addition, as far as construction is concerned, it be reduced even further, for example by mixing additional air or steam into the primary process, i.e. the gas turbine process.

Thus, the combustion gases flow from the second combustion chamber 21 to the second turbine 22. After this, the combustion gases (vaporise and) superheat feed water in the high temperature heat exchanger 12. The superheated steam exiting from it expands in the steam turbine 14a, b to a pressure less than 1 atm. The above-mentioned combustion gases pass from the high temperature heat exchanger 12 to the low temperature heat exchanger 15a,b and to a small branch to a heat exchanger 42 for preheating natural gas. Feed water from the post-condenser 10 pump 11 is heated in the low temperature heat exchanger 15a,b. From the pump 11, considered to be a two-stage one in the diagram, supplies additional water, if necessary, to the steam from the steam turbine 14a,b. If the pump 11 is a single-phase one, the water pressure must naturally be reduced by means of a valve. The above-mentioned mass flow of steam also goes to the low-temperature heat exchanger 15a,b. A branch is taken from the water preheated between the low-temperature heat exchanger 15a,b and the high-temperature heat exchanger 12 to the pressure reducing valve 57, wherein the water is partially vaporised and then introduced to between the above-mentioned compressor 1a and the compressor 1b. For the above-mentioned reason, the intermediate superheating in the low temperature heat exchanger 15a,b after the constant-temperature heating of steam can be reduced and in some versions the intermediate superheating can be (almost) non-existent. Because of this, the additional claims include limits for enthalpy and temperature with regard to the heat transfer in the heat exchanger mentioned above. Increasing enthalpy at a constant temperature before the intermediate superheating is naturally performed by means of the condensation heat of the steam contained by the combustion gas. From the low temperature heat exchanger 15a,b the steam is introduced into the steam turbine II 16 and thereafter to the condenser 10 at a pressure of less than 1 atm. If necessary, additional water is also fed into the process circulation.

It should be emphasised that the pre-cooling of the steam used for the intercooling of the compressor of the gas turbine process can also be taken, for example, by tapping the steam turbine and mixing it with additional water, if necessary, and by countless other means.

Intercooling of the compressor 1a,b shown in the figures could, of course, also be carried out in plants which do not have the inventive idea disclosed in this patent application, which differs from those in existing plants. In this case, excess heat, such as the waste heat from the oxygen compressor of an IGCC plant, is used to preheat the water injected into the compressor 1a, b. Thus that is an additional invention.

In FIG. 7, the combustion gases can expand in the gas turbine process to even below the maximum temperature of the Rankine process if the waste heat boiler is provided with additional combustion.

Figure 8:
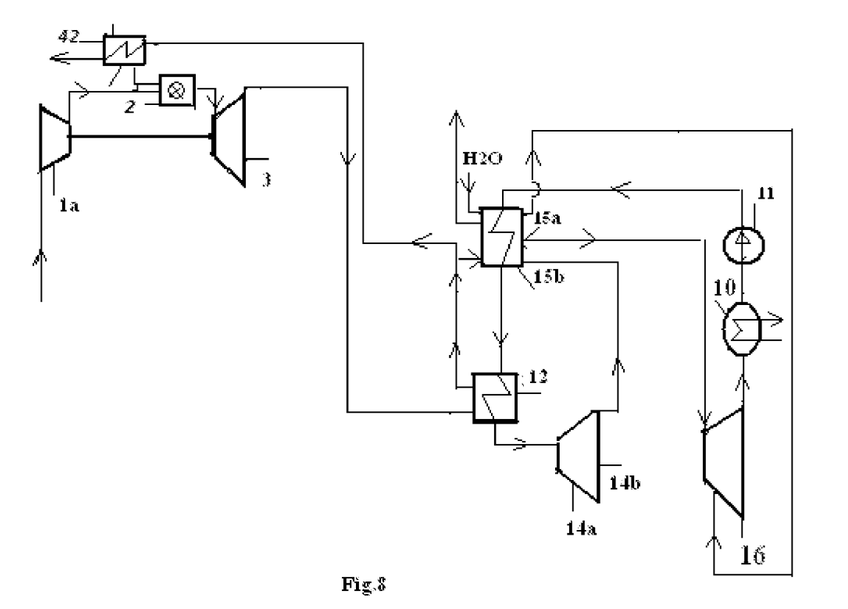
FIG. 8 illustrates a construction in which the utilization of the condensation heat of the steam contained by the combustion gases and the intermediate superheating of the steam are not connected to each other but take place in a different phase/pressure level with respect to the Rankine process.

FIG. 8 illustrates a process with an intermediate supply of steam to steam turbine II 16 at a pressure of less than 1 bar. Compared to the previous figures, the minimum pressure of the steam turbine 14a, b is, for example, about 3 to 8 bar, and this steam turbine is followed by the intermediate superheating of the circulation medium, i.e. steam. Since the recovery of the condensation heat from steam formed in the combustion is a separate step, it is carried out in another heat exchanger or at the final part of the same waste heat boiler. In this case, additional water at a pressure of about 0.5 to 0.8 bar is introduced to the process circulation and vaporized as the steam produced during combustion at the low temperature heat exchanger 15a, b condenses into liquid. The evaporated additional water is then introduced as a tap feed to steam turbine II 16.

Additional water can be taken between the two-stage pump or also from the main steam circulation before the vaporisation phase. In this case, the valve is used to reduce the pressure to a suitable level (such as 0.7 bar). If the heat exchanger 15b were separate, it would be advantageous to direct the combustion gases from it, for example, to the heat exchanger 15a. This case is disclosed in the claims of the CHP plant for the sake of clarity, but it also includes an integrated heat exchanger.

Figure 9:
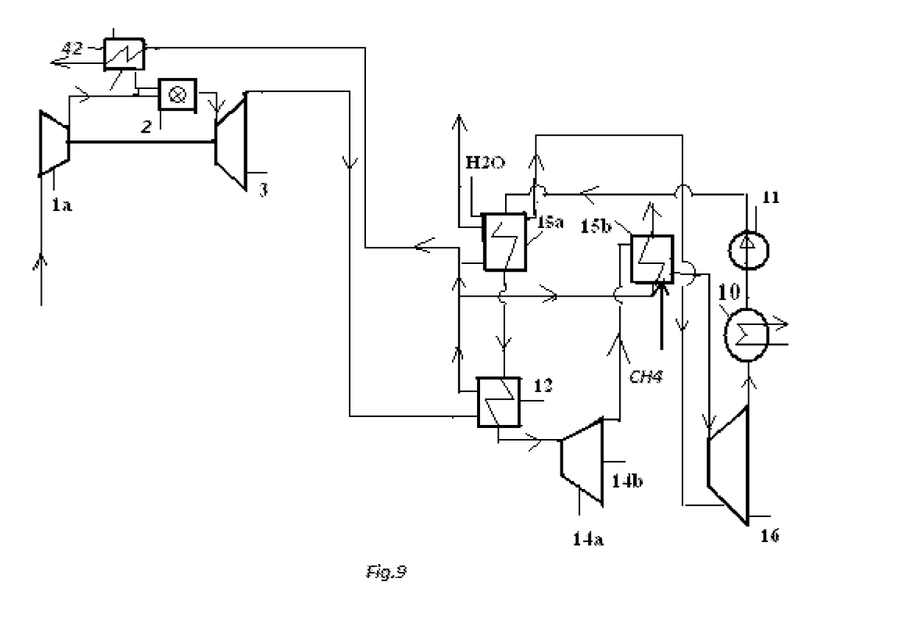
FIG. 9 depicts a dual-fuel version of FIG. 8. The difference to FIG. 8 is the heat exchanger 15$a$, $b$ according to FIG. 1.

FIG. 9 illustrates a plant using natural gas as fuel and having an additional combustion with natural gas in the heat exchanger 15b. In a practical application wood or black liquor would be more likely to be used as additional fuel than natural gas, as the invention allows a very high partial load efficiency for combustion of wood. Since the final temperature of the intermediate superheating is relatively low (about 600K in the example calculations), the final temperature of the intermediate superheating can be increased from 200 to 300 K to a value of 800 to 900 K with, for example, intermediate superheating pressure of 4 bar. The plant according to the figure is also very suitable for combustion of black liquor. Safety requirements are important in recovery boilers, so a low steam pressure level is an advantage. A CHP design is also possible, and a very competitive design would be, for example, one in which steam turbine II does not have a tap feed, with the rest of the heat of the heat exchanger 15a being utilised as heat energy instead. A part of that heat energy can also be used for heating, for example, natural gas or injected water. Naturally, the above-mentioned temperature of 800 to 900 K is also achievable if the steam enters the high temperature heat exchanger from intermediate superheating before steam turbine II 12.

The claim related to additional combustion relates to FIG. 9 and is also applicable to existing plants. In the existing gas turbine combined cycle plants, additional combustion is not used for increasing the final temperature of intermediate superheating, but it rather has an effect on the mass flows of the dual-pressure level process. Using the energy of the additional combustion in intermediate superheating and for increasing the final temperature of the intermediate superheating achieves a very high partial efficiency of solid fuel.

Figure 10:
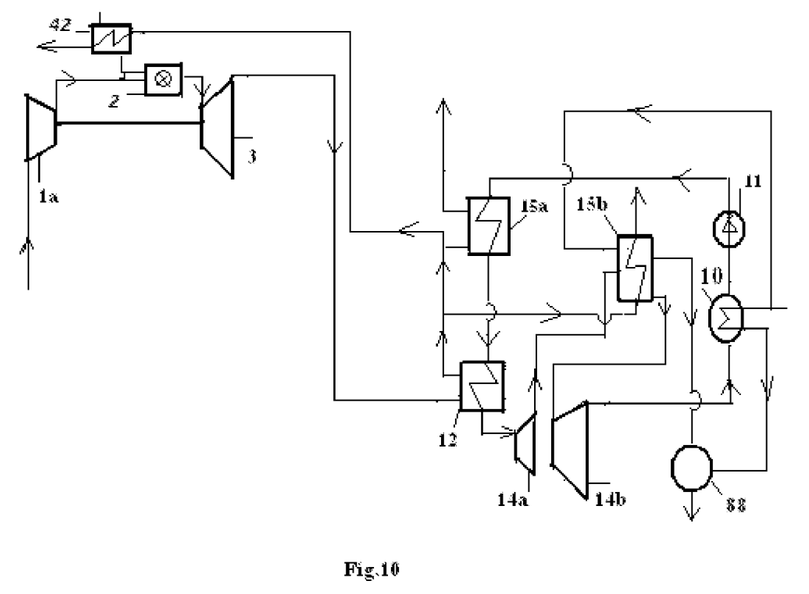
FIG. 10 illustrates an innovative CHP application.

FIG. 10 differs from FIG. 1 in that it does not have a low-pressure turbine 16, i.e. it is a pure CHP plant. The inventive idea is based on the fact that a portion of the previously mentioned ⅓ of the mass flow is used for heating a portion of the district heating water (pressure sufficient to prevent vaporization) in the heat exchanger 15b and the remaining water is heated in the condensation heat exchanger 10. The heat exchanger 15b provides water at a temperature of up to 200 to 300 C, so the desired 100 C for district heating water can be obtained by expanding in a steam turbine 14b to below 1 atm, possibly from 0.4 to 0.6 bar. This is due to the fact that the mass flows of water are then mixed in a mixing heat exchanger 88 wherefrom they are directed to transfer of district heat. This will produce more work from the steam turbine. The figure also shows the intermediate superheating between the steam turbine 14a and 14b. This is not required, but is suitable for the installation. In the heat exchanger 15b, the intermediate superheating is thus effected at a higher temperature (e.g. pressure of 4 to 15 bar) and water is heated at a lower temperature. This invention can also be utilised in existing plants. The remaining heat of combustion gases can also be utilised, for example, with a flue gas scrubber. Naturally, intermediate superheating can be effected differently from this disclosure, in the high temperature heat exchanger 12.

If pure oxygen is introduced to applications according to the invention, the power demand for its pressurisation is naturally lower if it is introduced to the second combustion chamber. It is sensible to take any additional air introduced to this combustion chamber from the compressor 1a,b by tapping. The air used for production of oxygen can also be taken from the tap of the compressor 1a,b. The compressor 1a,b naturally forms a single integrated compressor or is formed by two compressors. The additional air or oxygen can also be preheated in a waste heat boiler.

In the low-temperature part of the waste heat boiler (heat exchangers 15a,b), water is preheated and in the high-temperature part, water is vaporised and superheated. Intermediate superheating of steam also takes place in the low-temperature part. However, the additional combustion mentioned earlier also allows the use of the high temperature part for intermediate superheating, at least partly.

The invention has many advantages over existing installations. Naturally, the very high efficiency is the most significant advantage. Similarly, a smaller amount of expensive superheater materials is needed, because the intermediate superheating temperature and pressure are lower. The share of the gas turbine process of the total power is proportionally higher in CHP applications, which is important for competitiveness. Modern technology can also be applied to start-up and shut-down as well as to the shaft arrangement of compressors and turbines. The mass flow of water to the combustion chamber can naturally also be 100% of the mass flow of the steam turbine 14a,b.

Naturally, the expansion energy of natural gas and/or the cold energy generated by pressure decrease can be utilized, for example, for the cold cleaning/separation of the combustion gas, for production of oxygen or for the separation of carbon dioxide formed in combustion.

A thermal battery can also be connected to the process, if necessary. In some constructions, the additional water can also be introduced directly to point 35c (the place corresponding to point in FIG. 2).

It should be noted that the pressure range is disclosed in the main claim as wide as possible, but in practice the range is around 0.5 to 0.8 bar, even 0.3 to 0.95 bar may be possible.

The embodiment examples of the invention have been described only to illustrate the invention, and they do not limit the scope of invention, because details such as water treatment and generator(s), which are not necessary for understanding the invention, have been omitted for the sake of clarity. Thus, the invention is not limited to the described embodiments, but it includes everything covered by the scope of the appended claims.

The invention claimed is:
1. A method for improving the energy efficiency of an existing gas turbine combined cycle plant, the existing gas turbine combined cycle plant comprising: a gas turbine including a compressor that pressurizes combustion air which is combusted with fuel in a combustion chamber to form combustion gases, the compressor followed by a turbine and a high temperature heat exchanger, the combustion gases flowing to the turbine and the high temperature heat exchanger, a secondary process steam turbine II wherein water from the secondary process steam turbine II is condensed in a following condenser-heat exchanger, pressurized by a following pump, and then is vaporized, the method comprising;
   condensing heat of steam contained by the combustion gases in 1 atm pressure and formed in the combustion chamber wherein the condensed heat of steam is used for,
      increasing at a first low temperature heat exchanger an enthalpy of a circulation steam of a Rankine process at a pressure of less than 1 bar by 100 to 350 kJ/kg in constant temperature after a combined first steam turbine and second steam turbine and/or
      vaporizing at the second low temperature heat exchanger liquid additional water fed to the Rankine process circulation in a pressure below 1 bar that is combined with a main Rankine circulation only at a pressure below 1 bar after the combined first steam turbine and second steam turbine,
   after which, reheating a total steam mass flow in the first low temperature heat exchanger before the steam turbine II by using the heat energy from a portion of the combustion gases wherein the combustion gases are split after the high temperature heat exchanger to provide the portion of the combustion gases.

2. The method according to claim 1, wherein a tapped steam from the secondary process and introduced into the combustion chamber or a beginning of turbine vanes or a portion of a mixture formed by an air mass flow from the compressor and above-mentioned steam is preheated in the high temperature heat exchanger.

3. The method according to claim 1, wherein the gas turbine process comprises a second turbine and/or a second combustion chamber.

4. The method according to claim 1, wherein the high temperature heat exchanger or the first low temperature heat exchanger or the second low temperature heat exchanger is provided with an additional combustion at a pressure of 1 atm at least partially above a vaporisation temperature of the Rankine process, the combustion being utilized in vaporisation of steam of a Rankine cycle, superheating or intermediate superheating.

5. The method according to claim 1, wherein intercooling of the compressor is carried out with water injected into the compressor or with partially vaporised water or the intercooling is carried out by heat transfer in a heat exchanger.

6. The method according to claim 1, wherein injection water is taken partially from a tap outlet of the first steam turbine and the second steam turbine or from the feed water after the first low temperature heat exchanger and the second low temperature heat exchanger.

7. The method according to claim 1, wherein steam turbine II has a maximum pressure of at least 3 bar and is supplied with an additional mass flow of water at a pressure of less than 1 atmosphere as an intermediate supply.

8. The method according to claim 1, wherein the plant operates as a district heating/back-pressure plant by heating district heating water where a portion of the water of a district heating circuit is heated in the first low temperature heat exchanger and a remainder in the condensing heat exchanger, after which water circulations are combined in a mixing heat exchanger.

9. The method according to claim 1, wherein the first low-temperature heat exchanger and the second low temperature heat exchanger are parallel or connected together to form a single integrated heat exchanger.

10. The method according to claim 1, wherein the high temperature heat exchanger and the first low temperature heat exchanger and the second low temperature heat exchanger are connected together, forming a single waste heat boiler.

11. The method according to claim 1, wherein an amount of water in a secondary process circulation is kept constant by introducing additional water into the secondary process circulation and removing an amount of water from the Rankine process circulation.

12. The method according to claim 1, wherein a maximum pressure of steam turbine II is from 3 to 8 bar.

13. The method according to claim 1, wherein the steam from the Rankine process circulation is superheated without additional combustion by a temperature increase equal to 0 to 400 Kelvin by of the combustion gases from the gas turbine in the first low temperature heat exchanger and/or the second low temperature heat exchanger before the steam turbine II.

14. The method according to claim 8, wherein intermediate superheating of Rankine steam in the first low temperature heat exchanger and/or the second low temperature heat exchanger is provided.

15. An apparatus for improving the energy efficiency of an existing gas turbine combined cycle plant, comprising:
a gas turbine including a compressor that pressurizes combustion air which is combusted with fuel in a combustion chamber to form combustion gases, the compressor followed by a turbine and a high temperature heat exchanger, the combustion gases flowing to the turbine and the high temperature heat exchanger,
a secondary process steam turbine II wherein water from the secondary process steam turbine II is condensed in a following condenser-heat exchanger, pressurized by a following pump, and then is vaporized,
wherein condensing heat of steam contained by the combustion gases in 1 atm pressure and formed in the combustion chamber is used for,
increasing at a first low temperature heat exchanger an enthalpy of a circulation steam of a Rankine process at a pressure of less than 1 bar by 100 to 350 kJ/kg in constant temperature after a combined first steam turbine and second steam turbine and/or
vaporizing at a second low temperature heat exchanger liquid additional water fed to the Rankine process circulation in a pressure below 1 bar that is combined with a main Rankine circulation only at a pressure below 1 bar after the combined first steam turbine and second steam turbine,
subsequent to a total steam mass flow is reheated in the first low temperature heat exchanger before the steam turbine II by using the heat energy from a portion of the combustion gases wherein the combustion gases are split after the high temperature heat exchanger to provide the portion of the combustion gases.

16. The apparatus according to claim 15, wherein a tapped steam from the secondary process and introduced into the combustion chamber or a beginning of turbine vanes or a portion of a mixture formed by an air mass flow from the compressor and the above-mentioned steam is preheated in the high temperature heat exchanger.

17. The apparatus according to claim 15, wherein the gas turbine process comprises a second turbine and/or a second combustion chamber.

18. The apparatus according to claim 15, wherein the high temperature heat exchanger or the first low temperature heat exchanger or the second low temperature heat exchanger is provided with an additional combustion at a pressure of 1 atm at least partially above a vaporisation temperature of the Rankine process, the combustion being utilized in vaporisation of steam of a Rankine cycle, superheating or intermediate superheating.

19. The apparatus according to claim 15, wherein intercooling of the compressor is carried out with water injected into the compressor or with partially vaporised water or the intercooling is carried out by heat transfer in a heat exchanger.

20. The apparatus according to claim 15, wherein injection water is taken partially from a tap outlet of the first steam turbine and the second steam turbine or from feed water after the first low temperature heat exchanger and the second low temperature heat exchanger.

21. The apparatus according to claim 15, wherein steam turbine II has a maximum pressure of at least 3 bar and is supplied with an additional mass flow of water at a pressure of less than 1 atmosphere as an intermediate supply.

22. The apparatus according to claim 15, wherein the plant operates as a district heating/back-pressure plant by heating district heating water in a single-phase or two phases using condensation heat of steam from the steam turbine in a condensing heat exchanger and with condensation heat of steam contained by combustion gases at the first low temperature heat exchanger, or a portion of the water of a district heating circuit is heated in the second low temperature heat exchanger and a remainder in the condensing heat exchanger, after which water circulations are combined in a mixing heat exchanger.

23. The apparatus according to claim 15, wherein the first low-temperature heat exchanger and the second low temperature heat exchanger are parallel or connected together to form a single integrated heat exchanger.

24. The apparatus according to claim 15, wherein the high temperature heat exchanger and the first low temperature heat exchanger and the second low temperature heat exchanger are connected together, forming a single waste heat boiler.

25. The apparatus according to claim 15, wherein an amount of water in a secondary process circulation is kept constant by introducing additional water into the secondary process circulation and removing a required amount of water from the Rankine process circulation.

26. The apparatus according to claim 15, wherein a maximum pressure of steam turbine II is from 3 to 8 bar.

27. The apparatus according to claim 15, wherein the steam from the Rankine process circulation is superheated without additional combustion by a temperature increase equal to 0 to 400 Kelvin by of the combustion gases from the gas turbine in the first low temperature heat exchanger and/or the second low temperature heat exchanger before the steam turbine II.

28. The method according to claim 22, wherein intermediate superheating of Rankine steam in the first low temperature heat exchanger and/or the second low temperature heat exchanger is provided between the first steam turbine and the second steam turbine.

* * * * *